(12) United States Patent
Castineiras

(10) Patent No.: US 8,589,309 B2
(45) Date of Patent: Nov. 19, 2013

(54) METHODS FOR GENERATING AND SELLING CUSTOM POSTAGE

(75) Inventor: George A. Castineiras, Farmington, CT (US)

(73) Assignee: Castineiras Companies, LLC, Farmington, CT (US)

( * ) Notice: Subject to any disclaimer, the term of this patent is extended or adjusted under 35 U.S.C. 154(b) by 1014 days.

(21) Appl. No.: 12/344,678

(22) Filed: Dec. 29, 2008

(65) Prior Publication Data

US 2009/0177545 A1 Jul. 9, 2009

Related U.S. Application Data

(63) Continuation-in-part of application No. 11/396,895, filed on Apr. 3, 2006, now abandoned, which is a continuation-in-part of application No. 11/168,651, filed on Jun. 27, 2005, now abandoned.

(60) Provisional application No. 61/017,351, filed on Dec. 28, 2007.

(51) Int. Cl.
*G06Q 10/10* (2012.01)

(52) U.S. Cl.
USPC .......................................... 705/329; 705/402

(58) Field of Classification Search
USPC ................................................. 705/329, 402
See application file for complete search history.

(56) References Cited

U.S. PATENT DOCUMENTS

| 2003/0208360 A1* | 11/2003 | Kaas ................................. 705/1 |
| 2004/0054544 A1* | 3/2004 | Sloot ................................ 705/1 |
| 2004/0143520 A1* | 7/2004 | Barnum et al. ................. 705/30 |
| 2004/0254898 A1* | 12/2004 | Parker et al. ................. 705/402 |
| 2006/0173729 A1* | 8/2006 | Clark .............................. 705/10 |

OTHER PUBLICATIONS

Breast Cancer Stamp (1998).*
Family Violence Fundraising Stamp (2001).*

* cited by examiner

*Primary Examiner* — Carrie Gilkey
(74) *Attorney, Agent, or Firm* — MKG, LLC

(57) ABSTRACT

A custom postage has an artwork region and an adjacent cancellation region that includes a meter mark. The artwork region contains an original image having a top edge adjacent to the cancellation region. The custom postage may be placed onto an item of mail with a delivery address thereon, with the custom postage oriented to the upper right of the delivery address and with the image in a vertical orientation relative to the delivery address. The custom postage may be offered for sale as a fundraising effort, optionally via a website. The website may also include a social citizenship program and/or it may promote literacy.

14 Claims, 6 Drawing Sheets

US 8,589,309 B2

METHODS FOR GENERATING AND SELLING CUSTOM POSTAGE

CROSS-REFERENCE TO RELATED APPLICATION

This application claims the benefit of U.S. provisional patent application Ser. No. 61/017,351, filed Dec. 28, 2007, which is incorporated herein by reference, in its entirety. This application is a continuation-in-part of application Ser. No. 11/396,895 filed Apr. 3, 2006, which is a continuation-in-part of application Ser. No. 11/168,651 filed Jun. 27, 2005.

FIELD OF THE INVENTION

The present invention relates generally to the production of custom postage.

BACKGROUND

A recent development in postage services is the availability of stamps that are created in part by a buyer, for example, a buyer may purchase postage stamps that bear a reproduction of a favorite photograph based on a digital image file provided by the buyer. Such stamps have two regions, an image region and a cancellation region. The cancellation region contains the information needed by the United States Postal Service (sometimes referred to herein simply as "the Post Office" or "USPS") to recognize the stamp as payment for postal delivery of the item to which the stamp is applied. The information, referred to herein as a "meter mark," is often provided in the form of a bar code. Once the Post Office accepts the stamp and assumes the task of delivery, the Post Office applies a cancellation mark onto the stamp so that the stamp will not be re-used. Unfortunately, the Post Office cancellation mark on custom stamps defaces the portion of the stamp. This defeats, or at least diminishes, the stamp buyer's desire to have the recipient of the mailed item recognize and enjoy the image. Custom stamps can be used by institutions such as schools, churches, charities, and the like as fundraising items, whereby a customer buys custom postage stamps from a supplier who contributes part of the proceeds the institution, as described, for example, in United States Patent Application Publication No. 20060293910 of George A. Castineiras, which is incorporated herein by reference, in its entirety. The fact that the Post Office's cancellation marks deface such custom stamps diminishes the value of such stamps as fundraising products.

SUMMARY OF THE INVENTION

The present invention resides in one aspect in custom postage that includes a substrate having an artwork region and a cancellation region. The artwork region contains an image of original artwork, and the cancellation region contains a meter mark. The image has a top edge and is oriented on the custom postage such that the top edge is adjacent to the cancellation region.

The present invention resides in another aspect in a method of offering a custom postage product. The method includes offering to sell custom postage having thereon an image of original artwork provided by a customer. An image of original artwork is received from a customer, the image having a vertical orientation whereby the image will have a top edge. An order for the custom postage product is received and payment for the order is processed. A custom postage product is produced by providing a substrate and placing an image of original artwork and a meter mark on the substrate. The image of original artwork defines an artwork region on the substrate and the meter mark defines a cancellation region on the substrate, the image having a top edge and being oriented such that the top edge is adjacent to the cancellation region. The custom postage product is then delivered to the customer.

According to one optional aspect of the invention, a method is employed whereby the custom postage is offered as part of a fundraising event. In this embodiment, the method includes establishing a database for storing data therein, the database being associated with software-based programming for manipulating the data. An inquiry is received from, or on behalf of, a beneficiary organization regarding offering custom postage as part of a fundraising event. Initial information is collected from the beneficiary organization and is stored in the database. The software based programming is caused to generate a unique beneficiary organization identification code and to associate the unique beneficiary organization identification code with the initial information stored in the database. The software-based programming is also caused to extract relevant information from the database and to generate artforms upon which participants in the fundraising event can create artwork, the artforms having the unique beneficiary organization identification code associated therewith. A plurality of the artforms is distributed to the beneficiary organization and thereby to the participants. The artforms, information relevant to the orders and information identifying each of the participants are collected. Payment information relevant to purchasers of the custom postage is extracted and payments therefore are processed. An image of each piece of artwork, information relevant to the orders and the information identifying each of the participants are entered into the database and are associated with one another and with the relevant beneficiary organization identification code by the software-based programming. The software based programming is caused to generate a unique participant identification code for each participant and to associate the participant identification code with the information stored in the database relevant to the participant and with the relevant beneficiary organization identification code. The software-based programming is caused to manipulate the data stored in the database to generate printing information for the custom postage. The printing information is used to print the custom postage; and the printed custom postage is shipped to the purchasers thereof.

The invention also resides in another, independent aspect that provides a method for conducting a fundraising effort. This method comprises soliciting, or receiving, an inquiry from a beneficiary organization regarding offering custom postage as part of a fundraising event conducted on behalf of the beneficiary organization. A database is established for performing at least one of tracking, manipulating and storing therein, information relevant to the fundraising event, the database having software associated therewith for manipulating the information stored in the database to generate desired outputs. Instructions are provided to the beneficiary organization regarding the manner in which the fundraising effort will be conducted. At least one image relevant to the beneficiary organization is received, the image to be displayed on the custom postage. The beneficiary organization is provided with the at least one image for approval, and with viewing means by which the custom postage having the at least one image displayed thereon can be viewed. The viewing means are unique to the beneficiary organization and accessible only via notice from or on behalf of the beneficiary organization. Orders for the custom postage and payment instructions for the orders are received and processed. At least a portion of the database is populated with information relevant to the received orders. The orders are fulfilled and the custom postage is delivered to purchasers thereof.

In one specific embodiment, the method may include offering gift cards that can be redeemed for the custom postage.

According to another optional embodiment, at least one particular piece of custom postage bearing the original artwork is designated as collectible custom postage. The collectible postage is offered to the general public for purchase; and at least a portion of any proceeds derived from the sale of the collectible custom postage is designated as being due the beneficiary organization that held the fundraising effort for which the original artwork was created.

Optionally, the method may include selling postcards that bear the custom postage.

Still another aspect of the invention resides in a method for making gifts to a beneficiary organization, by developing custom postage as described herein, the custom postage including an image that is relevant to a particular beneficiary organization, accepting donations to the beneficiary organization, and providing donors with predetermined quantities of at least one of the custom postage and the prepaid postcards relative to an amount donated.

Yet another aspect of the invention resides in a method for conducting a social citizenship program by selecting a cause for which to raise funds and providing a database and software associated therewith, operable to perform one or more of storing, tracking, and manipulating information relevant to the social citizenship campaign. A plurality of art forms is distributed to participants in the social citizenship program and at least a portion of the participants create original artwork on the art forms. The original artwork is converted to an electronic format and is stored in the database with other information relevant to the social citizenship program. One or more pieces of original artwork are selected to be embodied in custom postage as described herein. Orders for the custom postage are solicited and payment for the solicited orders is received. Information relative to the solicited orders is stored in the database and the orders are processed. An amount of funds raised to be used in connection with the cause is determined.

DETAILED DESCRIPTION OF THE INVENTION

According to various aspects of this invention, custom postage (i.e., a mark signifying pre-payment toward the cost of postal delivery service) that has an artwork region and an adjacent cancellation region is created and is applied to a substrate to produce a custom postage product. The artwork region contains an image that is a reproduction of original artwork supplied for the custom postage by the buyer. The original artwork is a work that may be initially created by hand, e.g., a painting, drawing or the like, or it may be a digital image file that is modified by the buyer, e.g., a photo collage or the like. Typically, the image is provided in computer-usable form as a digital image file. A digital image file has an inherent orientation such that the image will have a top edge when printed or displayed for viewing. The supplier of the image (i.e., the buyer of the custom postage or the author of the original artwork) may use a software tool to "rotate" the image file so that when the image is viewed, the image is in the desired viewing orientation (referred to herein as the "vertical" or "upright" orientation).

The cancellation region contains a meter mark, i.e., a meter impression or other endorsement with information required by the USPS to identify the item as postage, e.g., an indication of value, the identity of the licensing post office, a meter authorization number (as applicable), etc.

The substrate may be a self-adhesive decal to be adhered to a parcel to be mailed, such that the custom postage product is in the form of a "stamp", or the substrate may be a parcel wrapper (e.g., a postage paid envelope or box or the like), or the substrate may be a mail parcel on which the custom postage is directly printed, e.g., a postage paid postcard or the like.

A custom postage product is created, offered for sale, and used such that when the custom postage is "canceled" by the Post Office, the image in the artwork region will be only minimally defaced, or not defaced at all, by the cancellation mark. For this purpose, the image is oriented in the artwork region with the top edge of the image adjacent to the cancellation region. The custom postage is preferably oriented on an item being mailed and having a delivery address thereon (such items being referred to generally herein as "parcels" to encompass envelopes for letters, postcards, packages, etc.) with the image in an upright orientation relative to the text of the delivery address, optionally above and to the right of the delivery address.

Figure 1:
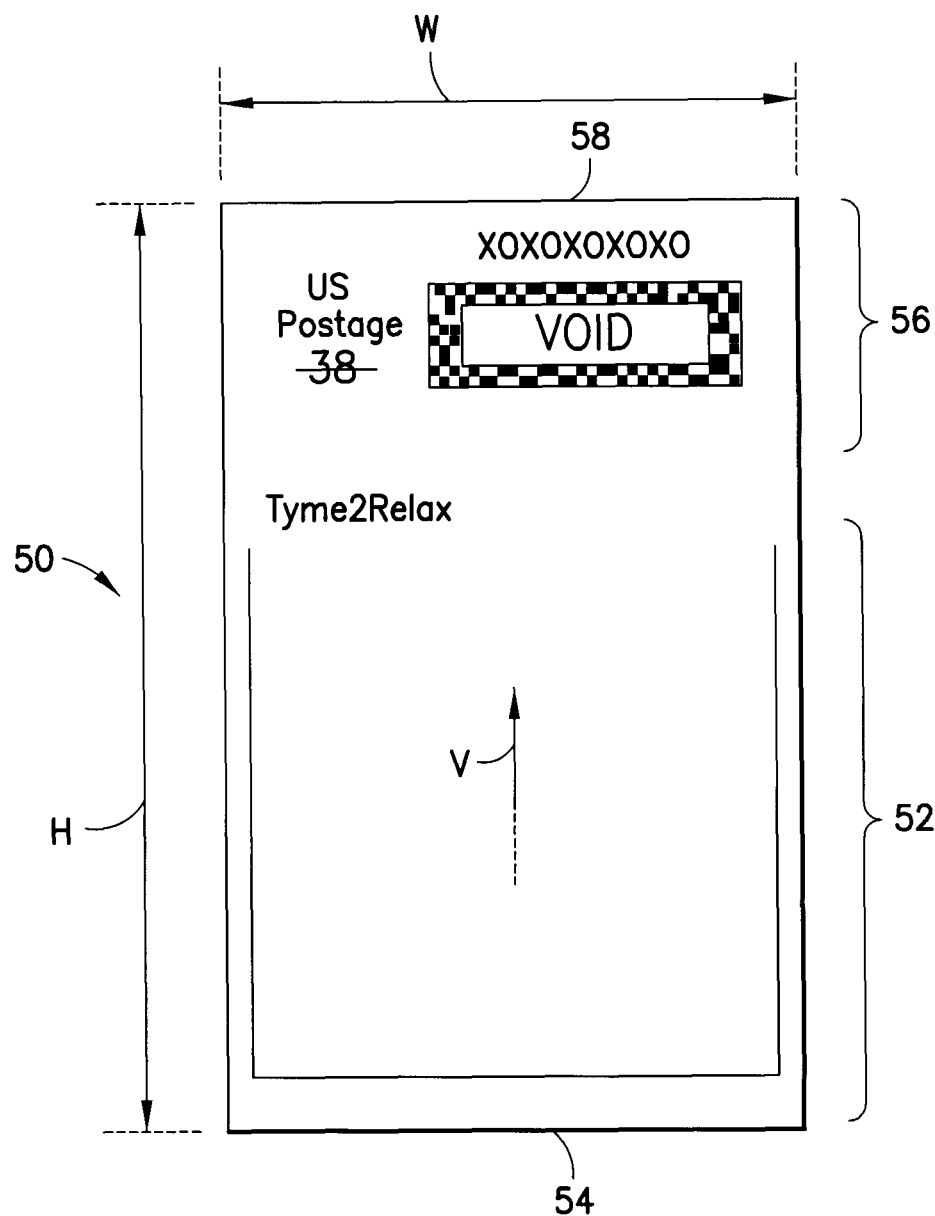
FIG. 1 is a schematic plan view of a custom postage according to the present invention.

In one illustrative embodiment shown in FIG. 1, a custom postage 50 may have a height H of about 2½ inch and a width W of about 1 9/16 inch, thus having an oblong rectangular configuration. The artwork region 52 on the custom postage 110 may be adjacent to a bottom edge 54 of the custom postage and may measure about 1½ inch×about 1 3/16 inch, thus allowing for a cancellation region 56 that measures about 1 inch×about 1 3/16 inch and that is adjacent a top edge 58 of the custom postage. The image of original artwork is oriented on the custom postage has a vertical orientation indicated by arrow V. The image is situated so that the top of the image is adjacent to the cancellation region. Accordingly, when the custom postage 50 is applied to an item of mail (i.e., a "parcel") bearing a delivery address with the image in an upright orientation relative to the delivery address (i.e., with arrow V roughly perpendicular to the delivery address), the cancellation region 56 is disposed above the image in the artwork region 52. So configured, the cancellation mark applied by the USPS, which will traverse the custom postage horizontally, will only minimally deface, or may not deface at all, the image in the artwork region of the custom postage.

In another embodiment, the present invention resides in a method for providing custom postage to be used as part of a fundraising activity. As described herein, an entity that generates custom postage products for sale in a fundraising activity is referred to as a "facilitating company," and the principal beneficiary of the profits of the fundraising activity is called the "beneficiary organization." The organization that promotes sales of the custom postage products is called a "fundraiser," and in some embodiments, the facilitating company may serve as the fundraiser. In other embodiments, the beneficiary organization may offer custom postage on its own behalf, thus acting as a fundraiser for itself.

In one embodiment, a facilitating company may target a potential beneficiary organization as a candidate for a fundraising effort which includes the sale of custom postage having thereon original artwork created by participants who offer their artwork for use in the fundraising effort. The participants may or may not be members of the beneficiary organization. Guidelines are provided to the beneficiary organization regarding the manner in which the original artwork is to be created. The artwork is then collected and one or more custom postage products having the original artwork thereon are offered for sale by the organization. Orders are received for the custom postage products and then custom postage that includes images of the original artwork is transferred onto the appropriate substrates. The custom postage products are then delivered to the purchasers.

In one embodiment of the present invention, the beneficiary organization is a school. The school offers for sale custom postage products bearing custom postage that includes images of original artwork created by its students. Each student creates his or her own original artwork to be imaged onto custom postage. The original artwork is collected manually and brought to a processing location in physical form, or the original artwork is transferred electronically to the processing location as a digital image file. At this location, if a digital image file has not already been provided, the original artwork is converted into a digital image file and the digital image file is stored in the memory of a computer.

Preferably, personalized promotional brochures are created to exhibit the potential use of an individual student's original artwork in custom postage. These personalized brochures are provided to each student along with order forms, to allow the students to offer for sale custom postage products that bear their custom postage. The order forms will be processed and payment received preferably via credit card or using an internet payment service such as PayPal®. Once the orders are processed, the custom postage product is then produced and either forwarded directly to the purchaser or the custom postage product is provided to the school for subsequent distribution. After a first order, the custom postage may be reordered as desired either by the school, or directly by individual purchasers. In either situation, the school would receive a portion of the proceeds. While a school has been described, the present invention is not limited in this regard as any organization, including, but not limited to, non-profits and charities are also possible beneficiary organizations.

Figure 2:
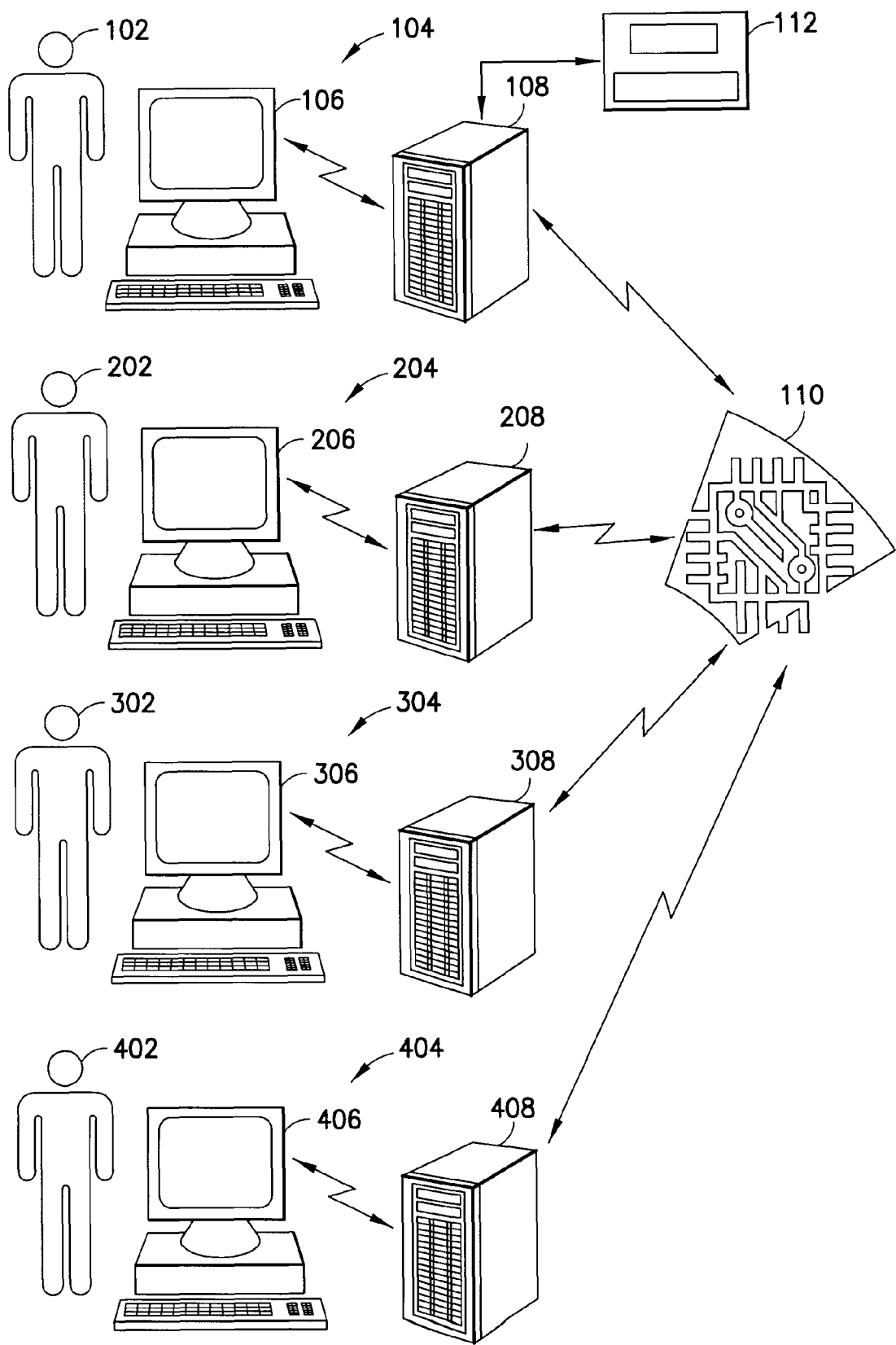
FIG. 2 is a schematic view of a combination of computer systems interconnected via a network in one embodiment suitable for carrying out various aspects of the invention.

FIG. 2 is a block diagram showing an environment in which various embodiments of the present invention may operate. As depicted, the environment comprises a facilitator (e.g., a facilitating company) 102 having use of a facilitator computing system 104 which includes a facilitator workstation 106 coupled to a facilitator server computing system 108. The facilitator computer system 104 is coupled to a computer network 110 via the facilitator server computing system 108. Optionally, the facilitator computer system 104 includes a printer 112 that is capable of printing custom postage on a substrate to produce a custom postage product. As used herein, the terms "connected," "coupled," or any variant thereof, means any connection or coupling, either direct or indirect, between two or more elements; the coupling or the connection between the elements can be physical or logical or a combination thereof.

A beneficiary organization 202 uses a beneficiary computing system 204 which includes a beneficiary workstation 206 coupled to a beneficiary server computing system 208. The beneficiary computer system 204 is coupled to the network 110 via the beneficiary server computing system 206.

A member 302 of the beneficiary organization 202 uses a member computing system 304 which includes a member workstation 206 coupled to a member server computing system 308. The member computer system 304 is coupled to the network 110 via the member server computing system 308.

A third party (e.g., a purchaser of custom postage) 402 uses a third party computing system 404 which includes a third party workstation 406 coupled to a third party server computing system 408. The third party computer system 404 is coupled to the network 110 via the third party server computing system 408.

In one embodiment, the network 110 is the internet and the facilitator computing system 104, the beneficiary computing system 204, the member computing system 304 and the third party computing system 404 each include a client application program that enables its user to access and transact with the others' server computing systems via the internet. For example, the client application program may include a web browser application or other interface application that is suitable for connecting to and communicating with the server applications.

While the facilitator computing system 104, the beneficiary computing system 204, the member computing system 304 and the third party computing system 404 are each described as including workstations, the invention is not limited in this regard, and in other embodiments, any of these systems may include any suitable device to provide access to the internet, for example, personal computers, server computers, hand-held or laptop devices, cell phones, personal digital assistants, smart phones, and so on.

In some embodiments, the beneficiary organization 202, the member 302 and the third party 402 can access and interact with the facilitator server computing system 106 by virtue of their interconnection via the network 110. In addition, the beneficiary organization 202, the member 302 and the third party 402 can interact with each other in various ways via the network 110 as described herein. For the sake of simplicity, only one beneficiary organization 202, one member 302 and one third party 402 are shown in FIG. 2, but the invention is not limited in this regard, and in other embodiments, there may be a different number of beneficiary organizations 202, members 302 and/or third parties 402 who interact and participate as described herein.

Figure 3:
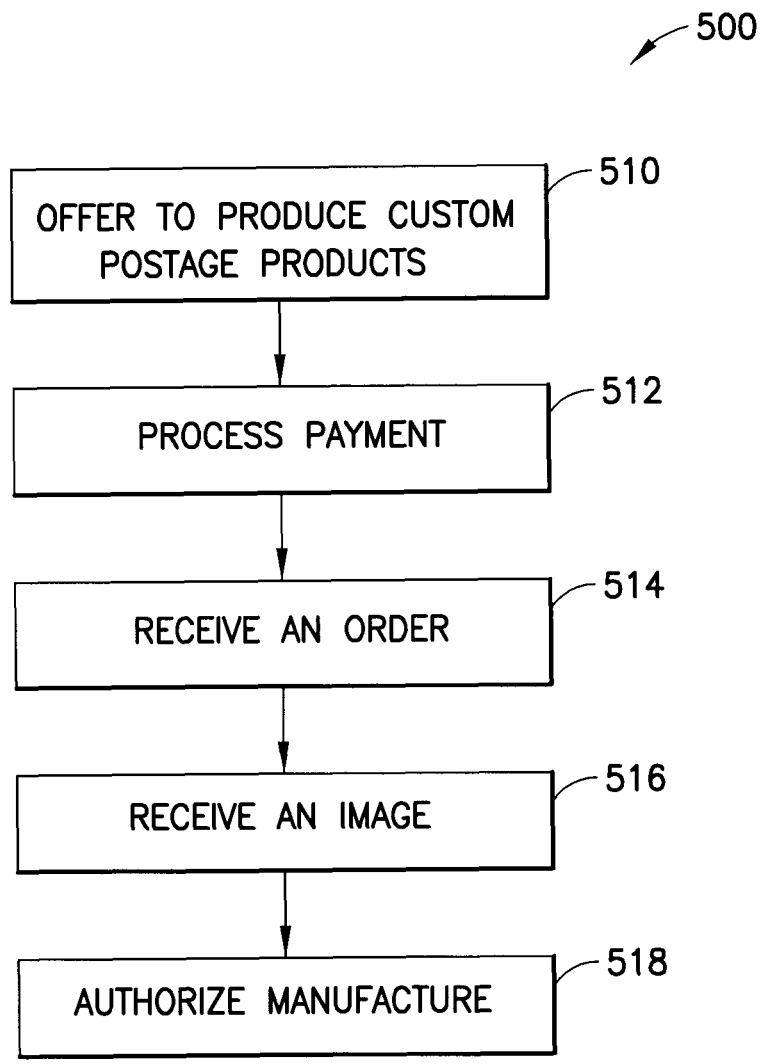
FIG. 3 is a flow chart illustrating one embodiment of an algorithm for facilitator software.

The facilitator computing system 104 is equipped with facilitator software that enables the facilitator computing system 104 6 to carry out the transactions described herein electronically. For example, in one embodiment, the facilitator software executes a first algorithm 500 as represented in FIG. 3. The first algorithm 500 includes a first step 510 of generating an offer to produce custom postage products for a beneficiary organization, a second step 512 of receiving an image for use in custom postage for the beneficiary organization; a third step 514 of receiving an order for custom postage products; a fifth step 516 of processing payment for said order and a sixth step 518 of authorizing the manufacture of the custom postage product. Optionally, the sixth step further includes printing the custom postage product at the printer 112.

In one embodiment, custom postage is offered as a fundraising effort, and the invention includes a method for conducting a fundraising activity (i.e., a fundraising drive or event) whereby inquiries are received by, and/or solicited from, a beneficiary organization regarding offering custom postage as part of a fundraising event conducted on behalf of the beneficiary organization. Such an embodiment is described in U.S. patent application Ser. No. 11/652,998, the disclosure of which is incorporated herein by reference, in its entirety. Briefly restated, this method provides that a database is maintained for tracking the solicitation or inquiry. Information resident in the database relevant to the fundraising effort can be tracked, manipulated and/or stored therein via software associated with the database. Preferably this software can also be employed to extract information from the database to generate desired outputs. For example, at the conclusion of the fundraising effort, a portion of the proceeds will be due the organization. The software associated with the database can be used to extract the information therefrom relevant to the amount due the organization and can be employed to generate a report pertaining thereto. The software described above can be part of a purchased database package, such as, for example, Microsoft Access® program, the software can be third party software, or the software can be customized software written for the facilitating company. Moreover, the database may be established and/or managed by the facilitating company or a third party acting on behalf of the facilitating company. In addition, at the conclusion of a fundraising event, the organization conducting the fundraising effort may retain the portion of the collected funds due it and forward the remainder to the facilitating company or an entity designated by the facilitating company. Similarly, the organization conducting the fundraising effort can collect all of the payments from purchasers of the custom postage and present the facilitating company with a single reconciled payment. This reconciled payment can be in the form of any of the payment instructions described herein. Moreover, the fundraiser may or may not withhold the amount due to the fundraiser.

Once the organization has agreed to conduct a fundraising effort, instructions are provided to the organization. At least one image relevant to the organization is created, by or at the behest of the company facilitating the fundraising effort (i.e., by the "fundraiser" or the "facilitating company") for display on the custom postage. Preferably several images are created so that the organization can have a broad selection of images to choose from. Each of the images created will have significance relevant to the organization for which the fundraising effort is being conducted. For example if the organization is an affinity group, such as an alumni association, the images may include scenes of the relevant university campus or buildings thereon. The images can also include logos or sports team images relevant to the university. However, the present invention is not limited in this regard as other images relevant to the particular organization such as, for example, images of distinguished or famous past or present members of the organization, can be created without departing from the broader aspects of the present invention. Once the images are created the organization chooses one or more of the images for inclusion on the custom postage.

Viewing means unique to the organization and accessible via notice therefrom or on behalf thereof, are provided by which custom postage can be viewed by the organization. The viewing means may include a web page having an URL unique to the organization. The webpage can also be protected via security protocols, such as, but not limited to, a password. In addition to being able to view the custom items on the webpage, a user accessing the page may also be able to edit the image to be included on the custom postage. Once the webpage is established the facilitating company either notifies the organization which then contacts those participating in the fundraising effort, or the facilitating company, based on a list provided by the organization, will contact the participants in the fundraising effort advising them of the manner by which the webpage can be accessed.

In one embodiment, orders for the custom postage are received by the facilitating company, preferably by placing the orders electronically via the webpage at which the custom postage is viewed. Ordering information may be accessible directly on the webpage or via a link to an ordering page, the link being on the webpage at which the custom postage is viewed. While electronic ordering has been described, the present invention is not limited in this regard as other ordering means can be employed, such as, ordering via the mail, fax or telephone. Moreover, while electronic ordering information via the webpage, or a link on the webpage where custom postage can be viewed has been described, the present invention is not limited in this regard as orders may be placed electronically via a wholly separate webpage or website that is not accessible via a link on the webpage where the custom postage is viewed.

In addition to ordering custom postage in the above-described manner, payment information and order information regarding the design and quantity of custom postage ordered must also be ultimately transmitted to the facilitating company. Payment information/instructions are received and processed by the facilitating company or another entity on behalf of the facilitating company. These payment instructions can take several different forms. For example, payment may be made electronically by credit or debit card by entering the relevant information into a payment section of the above-described webpages or via a separate payment webpage. The credit or debit card information along with the ordering information is then forwarded to the facilitating company for processing. Payment information can also be processed by accessing an internet payment system, such as, for example, Paypal®. While electronic payment has been described, the present invention is not limited in this regard, as payment may also be made by cash, checks or money order, or via credit or debit card with the credit or debit card information being transmitted by fax, mail, e-mail, or the like.

Subsequent to, or simultaneously with the placement of an order, the above-described database is populated with information relevant to the received orders. The database may be populated manually or directly if the orders are placed electronically. If the database is populated directly, it may be necessary for the software associated with the database to operate to facilitate the population thereof. The order information entered into the database may include such things as the name of the person placing the order, the type and number of custom postage ordered, the organization for which the particular fundraising effort is being conducted (i.e., the beneficiary organization), the method of payment and the shipping address to which the custom postage is to be sent.

Once the necessary information is received, the orders are fulfilled and the custom postage is sent to the purchasers thereof. Upon completion of the fundraising effort, the facilitating company calculates, either manually or by employing the software associated with the database, the percentage of the proceeds that are due to the beneficiary organization and once calculated forwards the funds to the beneficiary organization. Optionally, a portion of the proceeds from the fundraising effort may be allocated to a scholarship or other type of assistance fund. For example, a fund used to defray medical expenses of the members or others designated by the beneficiary organization conducting the fundraising effort may be established. This fund may be managed by the facilitating company or another entity.

The software associated with the database can have the ability to manipulate the information in the database to generate desired outputs. For example, financial reports, demographic reports, and the like may be generated. The term "associated" used herein with respect to the phrase "software associated with the database" should be construed to mean software that is in communication with the database or upon use can communicate with the database to manipulate information stored therein or to facilitate the storage of information therein.

Initial information is collected from the beneficiary organization and stored in the database. The initial information can include such things as the beneficiary organization's name, address, phone number, e-mail address and the name of a contact person within the beneficiary organization. However, the present invention is not limited in this regard as other or different information may also be initially requested without departing from the broader aspects of the present invention.

Upon receipt of the initial information a unique beneficiary organization identification code is established and associated with the initial information stored in the database. The beneficiary organization code can be generated by the software associated with the database automatically upon entry of the initial information into the database. The beneficiary organization code may also be established manually and manually associated with the relevant information stored in the database. The beneficiary organization identification code can be random or be as straightforward as the beneficiary organization's name.

Once entered, information extracted from the database may be used to generate artforms upon which participants in the fundraising event can create their own unique artwork. The artforms are preferably made from paper with a portion of the form delineated as the area of the artform on which the original artwork is to be created. The beneficiary organization identification code is associated with the artforms, preferably in the form of a bar code printed directly on the artforms. However, the present invention is not limited in this regard as other indicia such as, for example, a form number, can be associated with the beneficiary organization code without departing from the broader aspects of the present invention. Once generated, a plurality of the artforms is distributed to the beneficiary organization and thereby to the participants in the fundraising event. It may not be necessary for the facilitating company to generate the artform as they may also maintain a stock of the artform on hand. In such instances and as described above, it may only be necessary to associate a number or other indicia on the artform with the beneficiary organization code. However, the present invention is not limited in this regard as there may also be no need to associate the particular artforms with the beneficiary organization prior to their distribution. Alternatively, the artform may be forwarded directly to the participant via mail or e-mail. In addition, the artform may be resident on a webpage dedicated to the particular beneficiary organization and downloadable therefrom.

Once the participants in the fundraising effort are in possession of the artforms, the participants produce the original artwork thereon, preferably by drawing onto the artform. However, photographs or other materials, such as, but not limited to stickers materials "cut-out" from other sources, may also be placed on the artforms. Once the original artwork is completed, participants solicit orders for custom postage, custom checks, or mailing labels, bearing the participant's artwork thereon. Purchasers may also have the option of soliciting orders for other custom postage having artwork of other participants. Optionally, the webpage is unique to the particular beneficiary organization conducting the fundraising effort and accessible via password or other security protocol generated by the facilitating company and disseminated to prospective purchasers by or on behalf of the beneficiary organization that is conducting the fundraising effort. While the dissemination of the above-described password has been described as being accomplished by the beneficiary organization conducting the fundraising effort, the present invention is not limited in this regard as the facilitating company; pursuant to information concerning prospective purchasers provided to it by the beneficiary organization may also notify the prospective purchasers with respect to how to access the appropriate webpage. While the webpage has been described as being unique to the beneficiary organization, it may in addition, be unique to the particular individual's artwork. Accordingly, a beneficiary organization may have a plurality of unique web pages and URL's associated therewith, each being relevant to the particular organization and/or fundraising effort and to a particular participant's artwork.

The artforms and information relevant to any solicited orders as well as information identifying each of the participants is collected and forwarded to the company facilitating the fundraising event or another entity designated by the facilitating company. In the preferred embodiment of the present invention, the original artwork and ordering information are embodied in the artforms. However, the present invention is not limited in this regard as information relevant to solicited orders can reside somewhere other than on the artform. For example, a separate order form can be utilized.

Optionally, once the artforms have been printed, a starter kit is produced and forwarded to the beneficiary organization. The starter kit generally includes, the artforms having the above-described bar code printed thereon, a thank you letter, an explanation of what is in the starter kit, a best practice sheet, instructions for returning the completed artforms to the company, and the contact information for an account manager at the company. However, the present invention is not limited in this regard as items may be excluded, or other items included in the starter kit without departing from the broader aspects of the present invention.

Once the starter kit is received, the beneficiary organization can begin the fundraising event. As described in U.S. patent application Publication Ser. No. 11/396,895, the disclosure of which is incorporated herein by reference in its entirety, a fundraising event generally lasts from two to six weeks. During this period the custom artwork is created on the artforms and orders for custom postage are obtained by the participants. The completed artforms having the initial custom postage orders thereon are then returned to the company. This can be accomplished by the beneficiary organization collecting the artforms and returning them to the company, or the artforms can be directly mailed or otherwise transmitted to the company by the participants. Upon receiving the artforms, the company processes the payments pursuant to the information provided on the artforms. Payment can be made, or authorized to be made by any number of different methods. For example, payments can be made by credit card, or by using an internet based payment service, such as, for example, PayPal®. In addition, it is contemplated that payment can be made via check, cash or money order. In any instance where the company is unable to process the payment, the company will contact the entity making payment for resolution.

Once the artforms and ordering information are received, payment information relevant to purchasers of said custom postage is extracted from the ordering information and processed. Where web pages are employed for placing orders, credit or debit card information may be entered electronically via the particular webpage or an order entry page linked to the webpage. This information is then processed by the facilitating company and if any problems occur in processing a payment, the payer is contacted and the situation resolved. In addition, the beneficiary organization can collect all of the payments from potential purchasers and issue one reconciled payment to the facilitating company. If this system of payment is employed, orders may be placed via the above-described web pages. In such an instance, the beneficiary organization can be provided from the facilitating company with an accounting of the amounts owing and from whom. The beneficiary organization can then, as described above, forward a reconciled payment to the facilitating company in any of the above-described manners.

In addition, when the artform and any other material is received, at least a portion of the information contained on the artform and other materials may be entered into the database. Each piece of artwork is scanned and along with information relevant to the orders as well as information identifying each of the participants, is entered into the database. All of this information is associated with the relevant beneficiary organization identification code and a unique participant identification code for each participant is created and associated with the information stored in the database relevant to the participant, as well as with the relevant beneficiary organization identification code. The unique participant identification code is matched with the above-described beneficiary organization identification. This information may be used to create a unique URL and code that a purchaser may access to order or re-order custom postage or other items pertaining to the artwork associated with the particular participant to which the URL pertains. However, the present invention is not limited in this regard as a unique participant identification code is not required to enable this particular embodiment. Printing information for the custom postage bearing the participants artwork is generated and used to cause the custom postage to be printed. Once printed, the custom postage is shipped to the purchasers thereof.

In still another embodiment of the present invention, once a beneficiary organization commits to conducting a fundraising effort whereby the above-described artforms are employed, barcodes are placed on preprinted artforms. Preferably, the barcode has 15 digits that pertain to the following information. Four digits forming part of the barcode correspond to an identification number unique to the beneficiary organization conducting the fundraising effort. Two digits forming part of the bar code identify the particular state that the beneficiary organization or the fundraiser are located in. Four digits corresponding to the particular bar code identify the relevant year, and the last five digits identify the number of the particular artform. While a particular sequence and number of digits has been described as forming the barcode, the present invention is not limited in this regard as the number of digits, their order, and what they pertain to can be changed without departing from the broader aspects of the present invention.

Once an artform is completed and submitted to the facilitating company, the barcode is scanned by conventional means. The scanned information extracted from the barcode identifies the artwork on the particular artform, the beneficiary organization, the location and date(s), and the consumer and ties all of this information together. The scanned information can, via the software associated with the database, be transferred and stored directly in the database, and subsequently reviewed for accuracy, or the scanned information can first be subject to review for accuracy and then be input into the database.

In a related embodiment of the present invention, the artform is created by the fundraising effort participants on-line. In this instance, the creator of the artwork, or if the creator is a child, or not computer literate, someone on behalf of the creator accesses a webpage established to provide instructions for and to facilitate scanning the artwork onto an on-line artform. Once the relevant webpage is accessed, the appropriate barcode, previously provided to the creator, is typed into an area provided on the webpage. The creator or other person is then walked through, via on-line instructions, the process of scanning the artwork from their home or other location. Once the artwork is scanned into the relevant webpage the creator or other person will also be able to, via online instructions, customize the particular item or items he/she wishes to order. For example, if custom postage is being ordered, the purchaser will be able to, on-line, change certain colors on the postage.

In another embodiment of the present invention, the above-described images created on behalf of an affinity group can take the form of paintings or photographs created at the behest of the facilitating company. In addition signed images by prominent figures such as sports figures, famous alumni and the like, can also be provided. The originals, or copies, such as posters or lithographs can also be offered as part of the fundraising effort, as can commemorative plaques incorporating the images. In addition, the present invention contemplates these items being auctioned off on line either at a web site or web page established by or on behalf of the beneficiary organization, or at an on-line auction site such as, but not limited to EBAY®.

The present invention may optionally include designating selected original artwork as embodied on custom postage as collectable. Submitted artwork would be reviewed by the facilitating company or by designers of the facilitating company. If a fundraising effort participant's original artwork is selected, the custom postage would be designated as collectable and offered for sale to the general public. The beneficiary organization that originally conducted the fundraising effort relevant to the particular selected piece of original artwork will then receive a portion of the proceeds of the sales to the general public. In addition, the artist responsible for the original artwork may be eligible to receive a scholarship.

In still another embodiment of the present invention, gift cards are offered as part of the fundraising event or as an item for purchase after the fundraising event. The gift cards can be purchased in predetermined amounts, such as, but not limited to $25 or $50. Similarly, the gift card can be encoded with any amount.

Each gift card has a number or code printed thereon. This code is unique to one or both of a particular beneficiary organization or an individual participant in a fundraising effort. Where the beneficiary organization is an affinity group, the code is unique to the particular group. Where the beneficiary organization is a school, the code may be unique to the particular participant in the fundraising effort.

These gift cards may be offered as part of the fundraising effort or after the fundraising effort is over. The gift cards may have a finite period of usefulness, corresponding to a period of time for which custom postage bearing a particular image is available.

In practice, the gift cards can be ordered either via a webpage unique to a particular beneficiary organization or containing ordering information unique to one or more particular individuals. The gift cards bearing a number associated with a particular beneficiary organization and/or individual are forwarded to the purchaser.

Once received, the purchaser accesses a particular web page identified on the gift card or on instructions supplied with the gift card. The purchaser then enters the code on the gift card and is directed to a webpage whereon custom postage associated with the code on the gift card can be viewed and purchased using the card.

The information relevant to each gift card, such as, but not limited to, purchaser name and address, relevant beneficiary organizations and/or image, and/or individual are stored in the database. This information can be stored directly to the database via software associated therewith or the information can be manually entered into the database. When a purchase is made using a gift card, the database is updated either manually or automatically to reflect what was purchased and to adjust the dollar amount, if any, left on the gift card.

The beneficiary organization can also provide the above-described custom postage in exchange for a donation thereto, as described in U.S. patent application Ser. No. 11/863,931, which is incorporated herein by reference, in its entirety. As described in said application, the donor may be able to write-off 100% of the donation, within Internal Revenue Services guidelines, as a tax deduction. In addition to the images described above, the donor may also be allowed to create or otherwise provide his/her own image in the manners described herein for inclusion on the custom postage.

The present invention resides in another aspect in supplying prepaid postage postcards bearing the above-described custom postage thereon.

In another aspect of the present invention, gift-to-donation program is contemplated. In exchange for a charitable contribution, a donor can be given an amount of custom postage. The custom postage can incorporate images created on behalf of an affinity group as described above. The custom postage can also include original artwork created in the above-described manner. The images on the custom postage can also include logos of such things as universities, clubs, sports team and the like.

The particular beneficiary organization offering the custom postage in exchange for the charitable contribution can do so by pre-purchasing a quantity of the custom postage and, for example, can give a predetermined quantity of custom postage for a particular donation amount. Instead of having a quantity of custom postage on-hand, the particular beneficiary organization upon receiving a sufficient donation can advise the facilitating company to ship a quantity of custom postage products to the beneficiary organization. The donor may be given a choice of images to be printed onto the custom postage. The donor depending on the applicable tax laws, may be able to take a tax deduction on all or a portion of the donation.

Another optional feature of the present invention resides in a social citizenship program wherein fundraising is conducted on behalf of beneficiary organizations that provide monetary or other aid to people, populations, or segments of populations in need of financial or other aid. According to this feature of the invention, the entity conducting the fundraising effort can be a school, church or other entity. The participants, typically children, create original artwork as described above; the artwork can be relevant to the particular cause for which funds are being raised. However, the present invention is not limited in this regard as the artwork can simply be unique to the individual. The original artwork would be created as set forth above and converted into an electronic format, or created electronically. Participants in the fundraising effort, once their artwork is created could solicit orders for custom postage in the manner described herein above. In addition, the company facilitating the fundraising effort can also establish a website or web page accessible via a website through which custom postage or other items bearing artwork can be ordered with at least a portion of the proceeds being donated to the charity.

In another aspect of the present invention, the facilitating company will establish a website having entertainment and educational components thereto. Access to the website will be allowed upon registration of an original artwork image to be converted into custom postage. However, the present invention is not limited in this regard as access to the website may be gained in other manners, such as, but not limited to being listed or registered as a participant in a fundraising event, the participant/registrants identifying information being stored in the above-described database.

In one embodiment of the invention, regardless of the manner in which the website is accessed, or the security protocols employed, access will be secure for minors. In order to provide such security, a minor's parent or guardian can be required to provide their e-mail address. The parent's or guardian's e-mail address will be associated with the relevant minor's information so that the parent or guardian can be copied on e-mails sent via the website, by or to the minor. In addition, the present invention also contemplates the website being monitored by at least one of the facilitating company, the website host and the parents or guardians of one or more of the minors accessing the website. Mechanisms for reporting suspicious or undesirable behavior will be in place to prevent or limit minors from being subjected to inappropriate content.

Once an individual qualifies, access to the website can be gained in several different manners. For example, the individual can be e-mailed a username and a password that upon accessing the website, must be entered to go further. It should be understood that as used herein, the term individual should be broadly construed to mean a participant/registrant's parent or guardian if the participant/registrant is a minor. In addition, other security measures such as hashing, answering questions unique to the individual, and the like may also be employed. An individual may also be given the ability to change their username and password. While having a username and password e-mailed to an individual has been described, the present invention is not limited in this regard as a username and password can also be sent to an individual via regular mail, fax, or via telephone. In lieu of a username and password an individual may be forwarded a code that can be entered once the individual enters the website. Upon entering the code, the user can either gain access to the website and/or be required to establish a username and a password.

Access to the website may also be allowed via the registration of virtual custom postage. For example, custom postage may have been previously created as part of a fundraising effort. This custom postage can be registered on the website thereby allowing the registrant access thereto.

The website may be designed to promote literacy, via the establishment of a penpal system. In one embodiment of the penpal system, participants would register their original artwork and the virtual state in which they reside. The original artwork would be viewable in the form of a piece of custom postage. One objective of the penpal system being, as will be explained in greater detail below, for a participant to collect custom postage images from all fifty states in the United States. A participant collects these images by accessing an area of the website that contains other participant's custom postage images and the states with which the images are associated. The participant then chooses, by, for example, clicking on an image, another participant's piece of custom postage. By choosing the image, the user is then able to draft an e-mail to the author of the chosen image. Software associated with the penpal system then evaluates the e-mail to verify that the e-mail meets certain criteria imposed by the software. These criteria can include such thing as, but are not limited to, checking grammar and spelling, determining that the e-mail meets a minimum word count, that the e-mail does not use abbreviations and verifying the appropriateness of the content of the e-mail. Once it is determined that the e-mail message meets the set criteria, the e-mail message is then sent to the desired recipient. Once the e-mail is sent, the sender will be given credit for the particular state with which the recipient is associated. The sender may view the states with which he/she has been given credit for by accessing a page or other area on the website where the custom postage images corresponding to the credited states can be viewed. As the user accumulates credit for different states, rewards can be given to the user. These rewards can be given for such things as, the most stamps collected, the largest geographic area covered. These rewards can include such things as, but are not limited to, discounts on merchandise, or qualification for a scholarship.

The e-mail addresses associated with the penpal system can be provided by any service provider, or they can be provided by or on behalf of the facilitating company. If provided by or on behalf of the facilitating company, the individual given the e-mail address may be required to meet certain criteria to ensure that it is appropriate that they be given an e-mail address. These criteria can include such things as, but are not limited to, age verification, providing social security numbers, verification from the beneficiary organization conducting a fundraising effort that the person is actually a participant.

In addition to gaining an e-mail address in association with the above-described penpal system, the present invention also resides in providing e-mail addresses to users for a fee. The e-mail service would provide users with a safe environment whereby only other subscribers of the service could be e-mailed. Prior to being given an e-mail address, a user would have to be qualified. The qualification process may include such things as, but is not limited to age verification, obtaining parental permission, acceptable academic performance, recommendations from teachers or school administrators, and the like. The present invention also contemplates allowing user's to e-mail subscribers to other sites or services provided that these sites or services meet criteria that safeguards are in place to ensure a safe environment for users. These safeguards can include such things as, but are not limited to, monitoring of e-mails for appropriate content, monitoring e-mails for the use of certain words, and the like. In addition to e-mail, instant messaging can also be provided.

Because one of the objectives of providing e-mail access is to promote literacy, the invention may optionally provide that e-mail messages may have to meet certain criteria before they can be sent. For example, a minimum word count can be imposed. In addition, lists of vocabulary words can be provided and if used, rewards can be given, or the user could be prevented from sending e-mails that do not contain one or more of the vocabulary words. In addition, the use of abbreviations may also be prevented. The amount of time a particular user can spend on the website or e-mailing others may be limited. The website may also include additional security protocols wherein a parent or guardian, or other authorized person can be required to enter a password in addition to the user's password. Prompts requiring the entry of the additional password can also appear on the screen. These prompts can include such things as inquiring whether a user has done his/her homework and requires an e-mail from a parent or guardian validating the user's response.

The present invention also contemplates providing a type of virtual auction on the above-described website. A user would enter his custom postage into the virtual auction along with others. Users could then vote for their favorite custom postage. The auction could be categorized with user's voting for their favorite custom postage within a particular category.

In addition to the rewards discussed thus far, the present invention also contemplates user's gaining the ability to access sites advertised on the facilitating company's website. The advertiser's would provide user's who have earned rewards with discounts to their services and/or merchandise.

Optionally, the above-described website may include advertising thereon. The advertising would have to be appropriate to the website. The advertising can be in the form of a banner ad, a pop-up advertisement, or a link to the advertiser's website. However, the present invention is not limited in this regard as the advertising may also be accessible via a links page on the website whereby a user can choose what advertisements to access. Any advertising or listings on the website would be appropriate to the content and theme of the website.

Access to the above-described facilitating company's website can be free with the registration of new custom postage each year, and/or a fee can be charged for yearly registration.

Once the above-described steps and operations are accomplished, the database will be populated with, inter alia, unique artwork entries, participant/artist information, beneficiary organization information—the beneficiary organization information being associated with the relevant participants in the fundraising event, the beneficiary organization identification code and the unique participant identification code. The database and software-based programming associated and operable therewith function to track all art submissions specific to the participant, team or other subset of participants in an beneficiary organization, such as, but not limited to clubs.

In an embodiment of the present invention, where the beneficiary organization is a school, the artwork forming part of the completed artforms will only be used for fundraising purposes within a single school year within a two year period from submission. However, the present invention is not limited in this regard as different time periods can be employed without departing from the broader aspects of the present invention. After the one-year period during which the fundraising event has been conducted, custom postage and other items incorporating participant's artwork may still be purchased. In one embodiment of the present invention a portion of the proceeds for purchases, made after the expiration of the fundraising event, of custom postage products or other items incorporating student artwork will be deposited into an account maintained by the company, for the student/participant. This money may be used by the student/participant for school tuition, to start an approved business, or for other company approved activities. In addition, the company may allow the student/participant to designate an approved charity, organization or other entity to which the portion of the proceeds will be designated.

As described in aforesaid U.S. patent application Ser. No. 11/396,895, prior to printing the custom postage, a final check may be performed. Any artwork that is inappropriate or for some other reason is deficient such that printing is not advisable will be returned and a refund for any moneys paid will be processed. Once the final check is performed, any approved artwork will then be printed as custom postage. The custom postage will be in stamp-like form, adhesively backed, and will be provided on sheets with a predetermined number of pieces of custom postage per sheet. Once printed, the custom postage is mailed directly to the purchasers along with a secondary sell sheet to allow participants to accept and place further orders.

Once orders pertaining to a fundraising event have been submitted, programming operable with the database will compile relevant information from the database to generate a financial report. Once generated, the financial report along with appropriate payment is forwarded to the beneficiary organization. Preferably, a first financial report and payment is made within 60 days of the initial order submission and a second financial report and payment made to the beneficiary organization at a time corresponding to the end of the fundraising event. For example, where the beneficiary organization is a school, the second financial report and payment may be made within 60 days of the end of the relevant school year. While two financial reports and payments at particular time periods have been described, the present invention is not limited in this regard as the number of financial reports and payments, as well as the timing associated therewith can vary without departing from the broader aspects of the present invention.

The present invention also contemplates the creation of awards and/or scholarships (hereinafter referred to collectively as scholarships) to be awarded at predetermined intervals, such as but not limited to, annually. The criteria for receiving the scholarships are set by the company and may be administered and evaluated by independent entities. For example, a number of top selling participants in a given area, district, or nationwide, may be chosen as qualifying for a scholarship. A number of independent judges will then evaluate the artwork submitted by each scholarship contender and chose which should receive the scholarships.

In addition to scholarship programs, commemorative awards and/or plaques incorporating the participant's artwork and custom postage may be offered. In addition, and in cooperation with the United States Postal Service, a number of pieces of artwork chosen based on particular criteria such as artistic content can be incorporated into United States postage stamps.

The present invention also contemplates purchasers having the ability to further customize the custom potage they purchase by being able to customize the colors of the printing corresponding to postage amount and any other printing on the postage, as well as borders around the postage. Methods for accomplishing this are disclosed and claimed in U.S. patent application Ser. No. 11/098,807 the disclosure of which is incorporated in their entirety herein by reference. To customize these colors a user accesses a web site where an image of the custom postage can be displayed and associated with a program operable to accomplish the above-referenced color customization. Once the image of the custom postage is displayed, a user selects any color on the image by pointing to it and "clicking" using a mouse or other pointing device. Once selected, that color is reproduced in the postage areas of the custom postage. In addition, the program can also generate a palette of selectable colors that are complimentary to the color selected with appropriate and necessary level of contrast. Once the palette is generated one or more of the colors thereon can be selected to customize the textual portion of the postage area.

Figure 4:
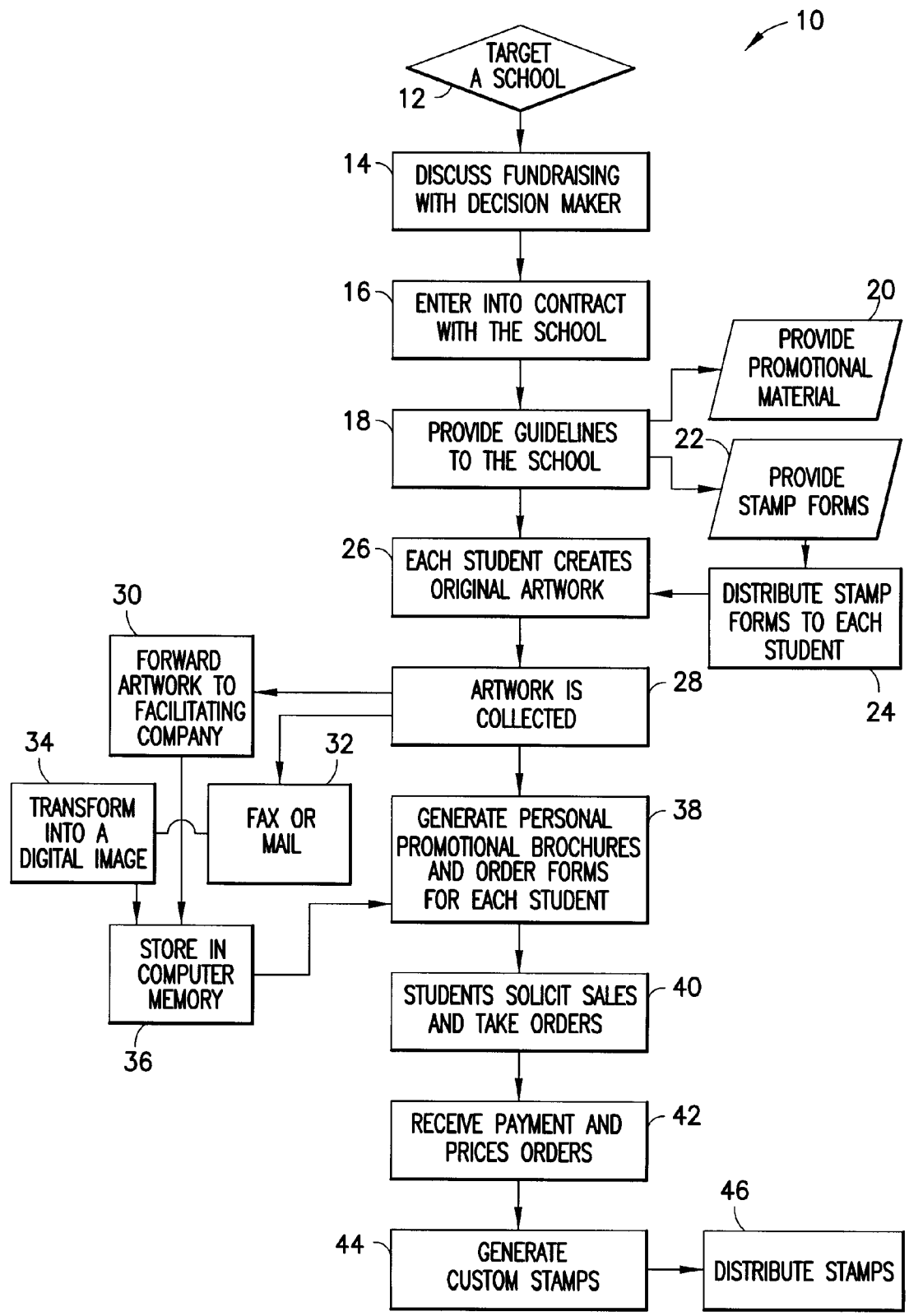
FIG. 4 is a flow chart illustrating one embodiment of an algorithm of the present invention involving a school and the generation of original artwork by the school's students for placement onto custom postage.

One specific embodiment of a method involving the sale of custom postage in accordance with a particular embodiment of the invention is represented in the flow chart of FIG. 4, and is generally designated by the reference number 10. In the method 10 and as part of a fundraising activity, students in a school each generate original artwork to be used on a postage stamp. The method begins by approaching, or being approached by, a particular school or school system 12. Public, private and nursery schools are all contemplated by the present invention; however, the present invention is not limited in that regard as any beneficiary organization can also employ the methods disclosed herein without departing from the broader aspects of the invention.

Referring back to FIG. 4, once the beneficiary organization has expressed an interest in conducting a fundraising effort in accordance with the present invention, the fundraising effort is discussed with the appropriate decision makers within the school 14. The decision makers could include the school principal, the Parent Teacher Organization, the Board of Education, or others. If the school decides to conduct the fundraising effort, a contract is entered into between the school and the company facilitating the fundraising effort, i.e., the fundraiser 16. The facilitating company then provides the school with guidelines 18 as to how to conduct the fundraising efforts. Included within these guidelines are promotional materials 20, such as, but not limited to, posters and brochures, as well as stamp forms 22 upon which the students will each create their own individual artwork. In addition, the guidelines will provide information to the students and faculty of the school regarding what is acceptable original artwork.

Following distribution of the guidelines, the school then distributes one or more postage forms to each student 24 participating in the fundraising effort who then creates his/her own artwork 26 on the postage form. Once created, the original artwork is collected 28 and forwarded to the facilitating company 32. The original artwork can be forwarded in any one of several different ways. For example, the artwork can be mailed or faxed to the facilitating company 32. The original artwork can also be scanned or digitally photographed and then e-mailed to the facilitating company. Once the original artwork is received by the facilitating company, if it is not already in a digital format, it is put into digital format 34 and stored in the memory of a computer 36. While the original artwork has been described herein as being collected, the present invention is not limited in this regard as each participant, or someone acting on behalf of the participant, can forward the original artwork electronically or otherwise, o the facilitating company.

Upon approval of each individual piece of original artwork, personal promotional brochures are produced 38 from the images stored in computer memory, preferably depicting the individual student's artwork on a postage stamp. The personal brochures are provided to each student along with order forms. These brochures can be provided in hard copy or can be electronically transferred via e-mail to the school for subsequent printing. Each student then solicits orders 40. The orders can be collected at the school and forwarded in bulk to the facilitating company, or the orders can be forwarded directly from each student to the facilitating company.

Preferably, as part of the ordering process, a purchaser provides the student, on the order form, with a credit card number. However, the present invention is not limited in this regard as checks or cash may also be accepted. In addition, once ordering information is received, the facilitating company can forward via e-mail payment information to a purchaser with instructions to then forward credit card payment over the internet or to use a payment processor such as PayPal® which securely processes payments between purchaser and purchasee 42.

Once payment is received, the custom postage is then generated 44 and forwarded to either the purchaser, or to the school for subsequent distribution 46. Once a custom stamp is generated, it can be subsequently reordered by a purchaser or by the school system. A portion of the proceeds from each order go to the school system. Depending on quantities ordered, the percentage of the sale price that goes to the school can vary. In addition, the fundraising effort can also include cash or prize incentives as awards for high sales.

While the above-described method involves each student's artwork being imaged onto a postage stamp, the present invention is not limited in this regard. The fundraising effort can also include a competition where one or a finite number of original pieces of artwork are selected from submissions from all of the students. For example, once the fundraising effort has been completed, the school can be given a printed poster of each stamp produced by grade level. The poster can be produced to highlight the top stamp based on sales and artwork. In addition, an art critic can be utilized to select the most artistic stamp based on each grade level. Prizes can be awarded to at least the top seller and most artistic. Prizes may also be awarded if certain sales milestones are attained. Moreover, collector's versions of a student's stamp can be made available for purchase with the ability to purchase the collectors editions for subsequent years. Where several schools are involved in the fundraising activity, national awards for the most artistic custom postage in particular categories and grade levels can be given.

In addition, cards or stationery bearing the student's original artwork can also be provided.

Figure 5:
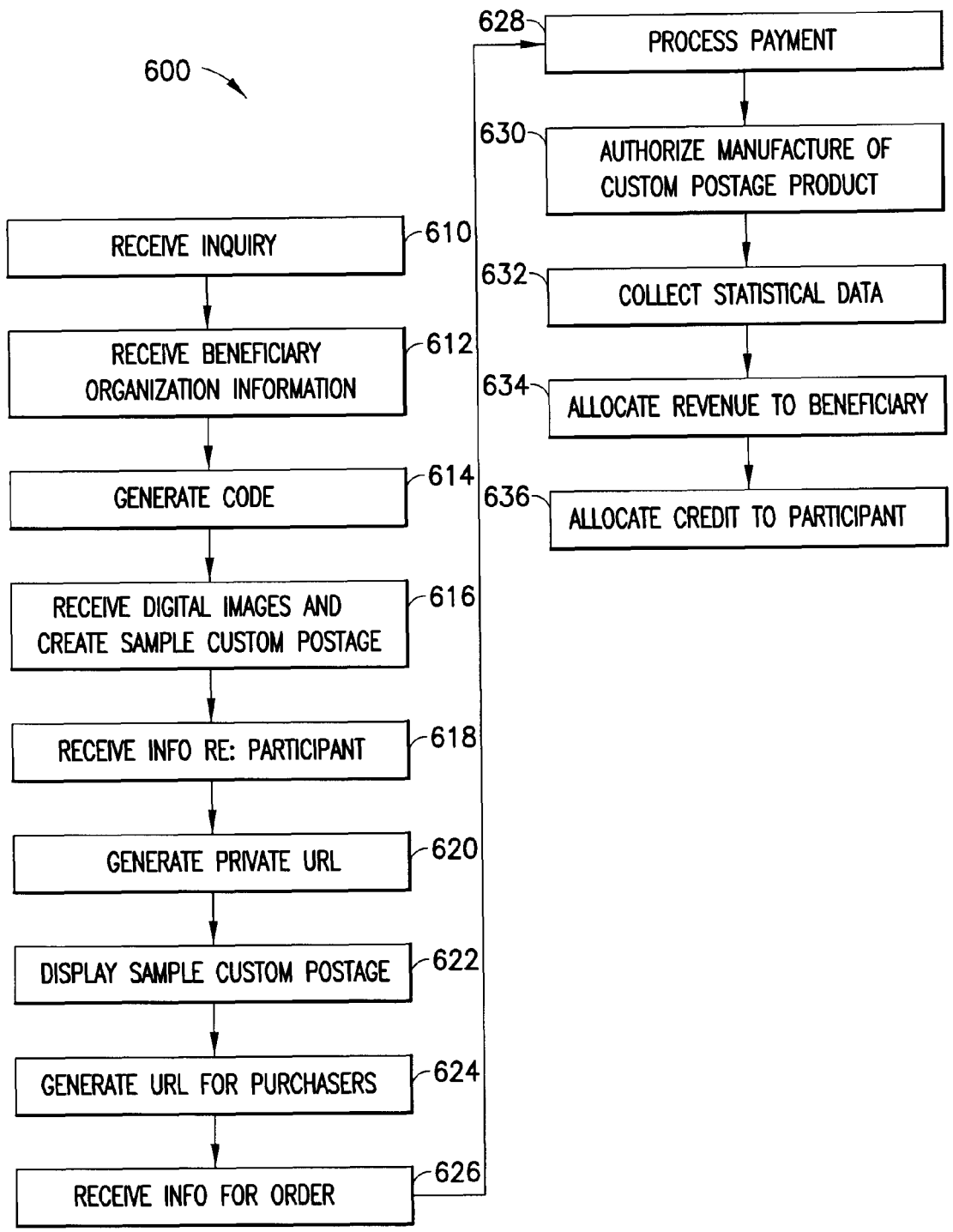
FIG. 5 is a flow chart illustrating one embodiment of an algorithm for facilitator software.
Figure 6:
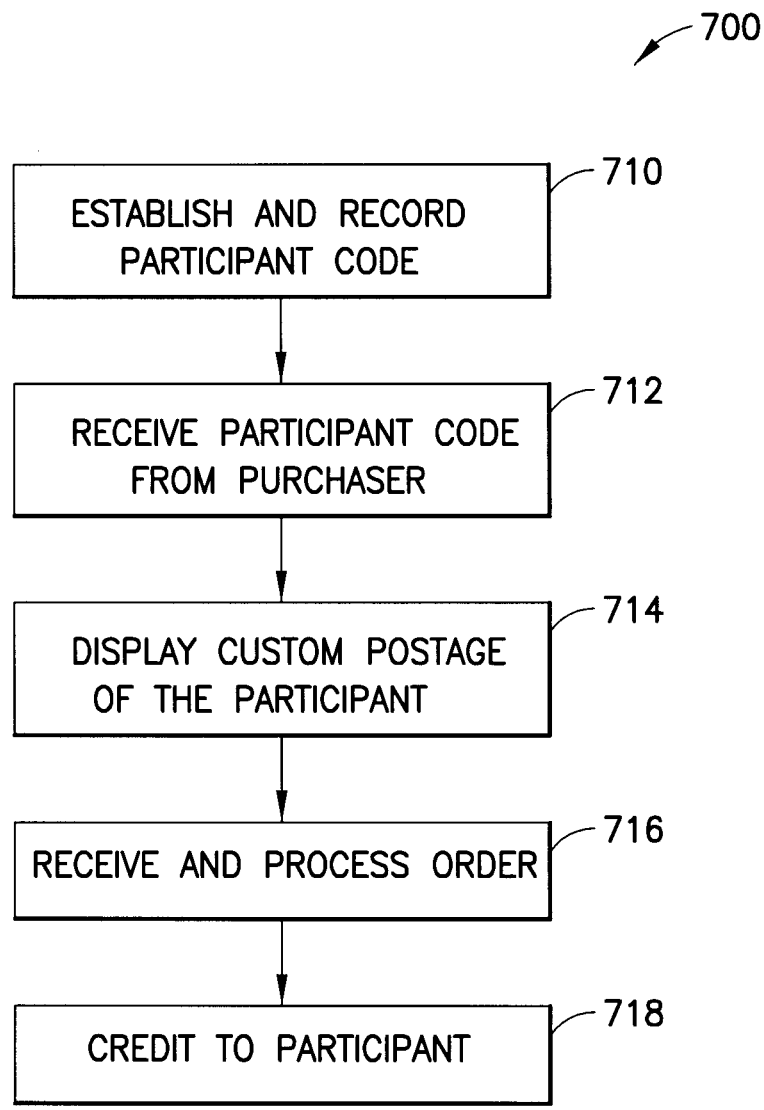
FIG. 6 is a flow chart illustrating another embodiment of an algorithm for facilitator software.

Algorithms for software for other embodiments and features of the invention are shown in FIG. 5 and FIG. 6. In one embodiment, the facilitator computing system 104 is equipped with facilitator software that enables the facilitator computing system 104 to execute a second algorithm 600 as represented in FIG. 5. The second algorithm 600 includes a first step 610 of receiving an inquiry from a beneficiary organization about the possibility of engaging the fundraiser to produce custom postage products for the benefit of the beneficiary organization. In the second step 612, information about the beneficiary organization is received from the beneficiary organization. Assent by the beneficiary organization 202 to the fundraising effort is received and a code is generated to identify the beneficiary organization 202 in the facilitator computing system 104 in step 614. Digital images are received from the beneficiary organization 202 and sample custom postage is produced therefrom in step 616. In optional step 618, information about the participant who supplied the image is received an entered into a database. In step 620, a private URL accessible only by the beneficiary organization 202 is created, and in step 622 sample custom postage is displayed at the private URL for approval by the beneficiary organization 202. In step 624, approval of the sample is received and a publicly accessible URL is created where custom postage products are offered for sale to the public. An order is received in step 626, including payment processing in step 628. Upon receipt of payment, the manufacture of the ordered custom postage product is authorized in step 630, optionally including the actual printing of the custom postage product if the facilitator computing system 104 is equipped with a suitable printer. Optionally, statistical data about the purchase is collected in step 632, and funds from the purchase are allocated to the beneficiary organization 202 in step 634. Optionally, credit to the participant whose image was used in the purchased product is tallied in the database in step 636, for future reporting purposes to determine a possible reward for the participant.

Optionally, the facilitator software includes a module that allows purchasers to select custom postage having images produced by a particular participant. For example, the module algorithm 700 of FIG. 6 includes a step 710 for establishing and recording a participant code in a database wherein custom postage that includes images provided by that participant can be retrieved for sale; a step 712 for receiving a participant code from a purchaser; a step 714 for displaying images or custom postage The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A method for offering custom postage as part of a fundraising event, said method comprising:
    offering to sell custom postage having thereon an image of original artwork provided by a customer;
    receiving an image of original artwork from a customer, the image having a vertical orientation whereby the image will have a top edge;
    providing a customer with a personal promotional brochure showing at least one image of custom postage having said customer's original artwork thereon and at least one order form receiving an order for said custom postage product;
    processing payment for said order;
    producing a custom postage product by providing a substrate and placing an image of original artwork and a meter mark on the substrate, the image of original artwork defining an artwork region on the substrate and the meter mark defining a cancellation region on the substrate, the image having a top edge and being oriented such that the top edge is adjacent to the cancellation region;
    delivering said custom postage product to the customer;
    establishing a database for storing data therein, said database being associated with software-based programming for manipulating said data;
    receiving an inquiry from, or on behalf of, a beneficiary organization regarding offering custom postage as part of a fundraising event;
    collecting initial information from said beneficiary organization and storing said initial information in said database;
    causing said software based programming to generate a unique beneficiary organization identification code and to associate said unique beneficiary organization identification code with said initial information stored in said database;
    causing said software-based programming to extract relevant information from said database and to generate artforms upon which participants in said fundraising event can create artwork, said artforms having said unique beneficiary organization identification code associated therewith;
    providing a plurality of said artforms to said beneficiary organization to distribute to said participants;
    collecting said artforms, information relevant to said orders and information identifying each of said participants;

collecting payment information relevant to purchasers of said custom postage and processing payments therefore;

entering an image of each piece of artwork, said information relevant to said orders and said information identifying each of said participants into said database;

said software-based programming causing said images of said artwork said information relevant to said orders and said information identifying each of said participants to be associated with one another and with the relevant beneficiary organization identification code;

causing said software based programming to generate a unique participant identification code for each participant and to associate said participant identification code with, the information stored in said database relevant to said participant, and with the relevant beneficiary organization identification code;

causing said software-based programming to manipulate said data stored in said database to generate printing information for said custom postage;

using said printing information to print said custom postage; and shipping said printed custom postage to said purchasers thereof.

2. A method as defined by claim 1 wherein said step of shipping said printed custom postage further includes shipping secondary sell sheets with said printed custom postage; said method including accepting additional orders for said custom postage subsequent to receiving an initial order of said custom postage.

3. A method as defined by claim 1 wherein prior to said step of receiving an inquiry, said method including establishing a web site having information pertaining to offering custom postage as part of a fundraising event, said website further including means for contacting a company facilitating said fundraising event; and wherein receiving an inquiry further includes accessing said web site to electronically contact said company.

4. A method as defined by claim 1 wherein said artform comprises:
a first side having an area whereon a participant can create artwork; and
an opposing second side including one area for notating orders for custom postage, another area wherein a parent or legal guardian can affirm by signature their assent to a participant's participation in said fundraising event, and
another area wherein terms and conditions are set forth.

5. A method as defined by claim 1 wherein including delivering said artforms as part of a starter kit, said starter kit including a best practice sheet, instructions for completing said artforms, and contact information for said company.

6. A method as defined by claim 1 wherein generating said artforms having said unique beneficiary organization identification code associated therewith includes causing a bar code indicative of said unique beneficiary organization identification code to be printed onto each of said artforms;
wherein entering an image includes scanning said image and said bar code into said database; and
further including associating said barcode with said beneficiary organization code.

7. A method as defined by claim 1 further comprising causing said software based programming to extract said participant identification codes and said beneficiary organization identification codes associated therewith from said database and to generate URL's, each URL being unique to a particular participant, from which custom postage bearing images unique to said particular participant can be ordered.

8. A method as defined by claim 1 wherein causing said software-based programming to manipulate said data stored in said database to generate printing information for said custom postage further includes encrypting said printing information and electronically transferring said encrypted printing information to a custom postage printing facility.

9. A method as defined by claim 1 wherein entering an image of each piece of artwork, said information relevant to said orders and said information identifying each of said participants into said database includes scanning said artwork into said database and manually inputting at least a portion of said information relevant to said orders and said information identifying each of said participants into said database; and wherein
manually inputting includes verifying said manually input information by causing two different individuals to each enter said manually input information and if a discrepancy is found, resolving said discrepancy before said manually input information is transferred to said database.

10. A method as defined by claim 3 wherein said website is configured to permit a purchaser to enter a participant identification code to access images of custom postage unique to a participant, and to select a particular color on said image forming a portion of said custom postage; and to cause portions of said custom postage other than said image to become said particular color.

11. A method as defined by claim 1 further comprising:
causing said software-based programming, in cooperation with said database, to generate statistical information relevant to predetermined criteria;
using said statistical information to determine participants eligible for a scholarship or prize offered by said company;
independently evaluating at least one of said artwork and said sales attributable to said eligible participants;
selecting at least one of said eligible participants as a recipient of said scholarship or prize and awarding said scholarship or prize to said eligible participant.

12. A method as defined by claim 1 further comprising:
subsequent to an expiration of a predetermined period of time, tracking purchases of custom postage relevant to an individual participant;
establishing an account for said individual participant;
depositing a portion of the proceeds of said purchases of custom postage relevant to said individual participant into said account; and
allowing said portion of said proceeds to be used for purposes approved by said company.

13. A method according to claim 3, wherein the website includes a penpal system wherein participants register their original artwork;
wherein a user of the penpal system chooses another participant's piece of custom postage;
the website being is to enable the user to draft an e-mail to the author of the chosen image; and
wherein the method includes evaluating the e-mail relative to certain criteria, and forwarding the email to the desired recipient if the email meets the criteria.

14. The method of claim 13, wherein participants register the states in which they reside, and a sender is given credit for sending mail to the particular state with which the recipient is associated, and rewarding the user for accumulating credit for different states.

* * * * *